United States Patent

[11] 3,609,289

[72] Inventor Kenneth J. Hathaway
      Nashua, N.H.
[21] Appl. No. 884,074
[22] Filed Dec. 11, 1969
[45] Patented Sept. 28, 1971
[73] Assignee Air Control Industries, Inc.
      Nashau, N.H.

[54] WELDING APPARATUS
     15 Claims, 8 Drawing Figs.
[52] U.S. Cl. .................................................. 219/130,
                                                        219/125
[51] Int. Cl. ..................................................... B23k 9/00
[50] Field of Search ............................................. 219/125,
                                                        130, 124

[56] References Cited
     UNITED STATES PATENTS
3,017,552 1/1962 Brouwer ........................ 214/125
3,281,047 10/1966 Weicht .......................... 219/125 X
3,450,858 6/1969 Pandjiris ....................... 219/125

3,515,844 6/1970 Colarossi et al. ............. 219/125

Primary Examiner—J. V. Truhe
Attorney—Sandoe, Hopgood and Calimafde

ABSTRACT: An automatic welding apparatus includes a housing that is pivotably and slidably mounted to a base and a spindle, adapted for reception of a workpiece, is rotatably and slidably mounted to the housing. A carriage having a torch, a heat sink and a finger slidably and rotatably mounted thereto is slidably supported by the shafts affixed o the housing. The working end of the torch is formed with an opening and a plurality of ports are radially disposed about the opening. An electrode extends through the opening and an inert gas exhausts through the ports. A voltage sensor generates a signal representative of the spatial relationship between the torch and the workpiece, the slidable movement of the torch being responsive to the voltage sensor signal. Programmable cam means, preset for tacking or continuous welding, is provided for switching the arc current, and means are provided for ejecting the workpiece out of the spindle upon completion of the welding cycle.

INVENTOR
KENNETH J. HATHAWAY

PATENTED SEP 28 1971

INVENTOR
KENNETH J. HATHAWAY

BY Morse, Altman & Oates

ATTORNEYS 3,609,289

WELDING APPARATUS

BACKGROUND AND SUMMARY OF THE PRESENT INVENTION

The present invention relates to welding and more particularly to an automatic welding apparatus. An apparatus of the aforementioned type is utilized in production welding of hermetically sealed precision components, such as casings of capacitors, transformers, resistors and the like, where flux and high temperature cannot be tolerated. Such apparatus, as presently known in the art, are cumbersome, complex and costly, and do not possess the versatility required of an arc welder suitable for either a production facility or an experimental laboratory.

An object of the present invention is to provide an automatic arc welding apparatus which is characterized by a base, and a housing pivotably and slidably mounted to the base, a spindle rotatably mounted within the housing provided with a locking means for engagement and disengagement of a workpiece. A carriage is slidably mounted to shafts affixed to the housing, and a torch having an opening adapted for the reception of an electrode and a plurality of ports radially disposed about the opening adapted for the expulsion of an inert gas about the electrode is slidably mounted to the carriage. A finger is rotatably mounted to the carriage for initiating expulsion of the inert gas, and a voltage sensor generates a signal representative of the spatial relationship between the torch and workpiece, the slidable movement of the torch being responsive to the voltage sensor signal. A heat sink adapted for engagement with the workpiece is slidably mounted to the carriage, and a programmable cam controls the arc current to the electrode for tacking or continuous welding. Mean are also provided for ejecting the workpiece from the spindle upon the completion of a welding cycle. The combination of the base, pivotable housing, slidable carriage, torch, finger, spindle, voltage sensor, heat sink, programmable cam and ejecting means provides a compact, inexpensive and versatile automatic arc welding apparatus admirably well suited for production facilities and experimental laboratories.

The invention accordingly comprises the apparatus possessing the construction and combination of elements, and arrangement of parts that are exemplified in the following detailed disclosure, the scope of which will be indicated in the appended claims.

BRIEF DESCRIPTION OF THE DRAWING

For a fuller understanding of the nature and objects of the present invention, reference should be had to the following detailed description of the preferred embodiment depicted in the accompanying drawings wherein:

FIG. 5b is a front elevation of an alternative embodiment of the torch of FIG. 5a;

FIG. 6 is a perspective of FIG. 5a

DETAILED DESCRIPTION OF THE PREFERRED EMBODIMENT

Figure 1:
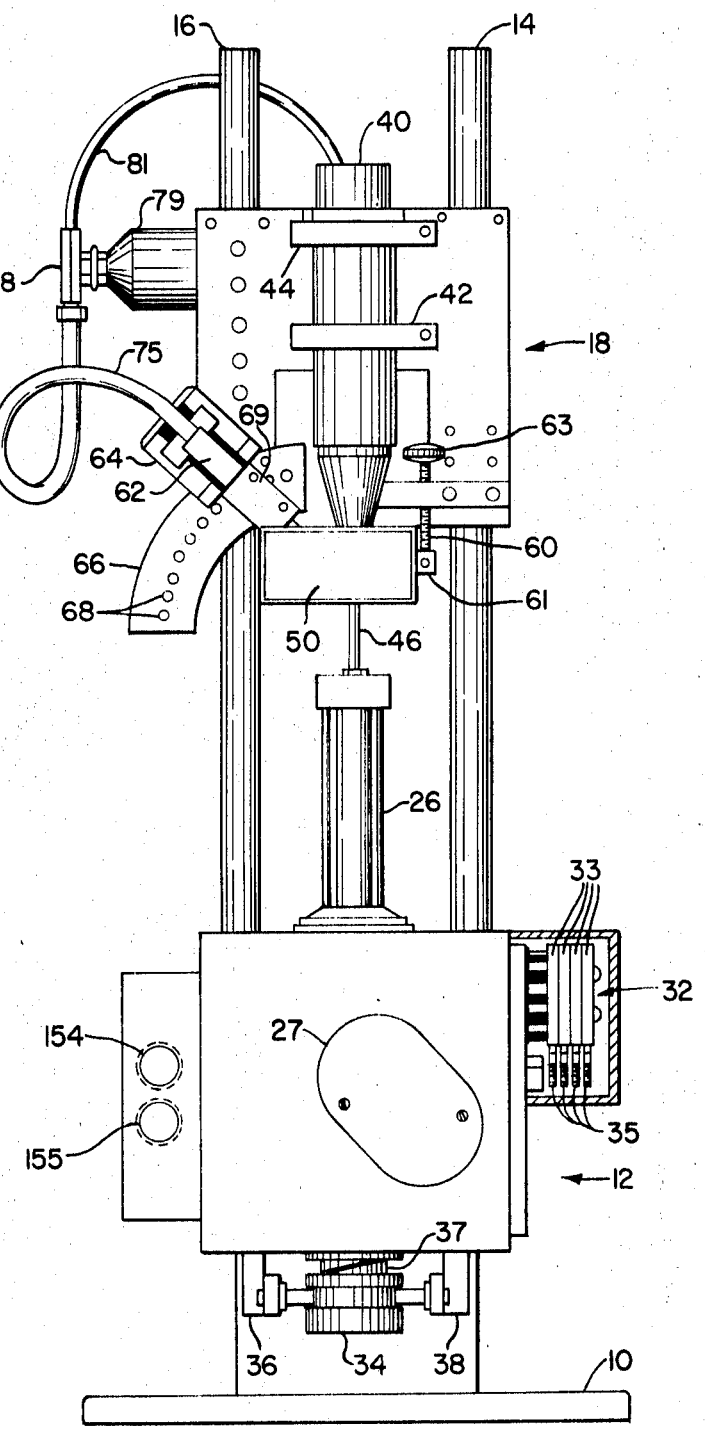
FIG. 1 is a front elevation of a welding apparatus embodying the present invention.
Figure 2:
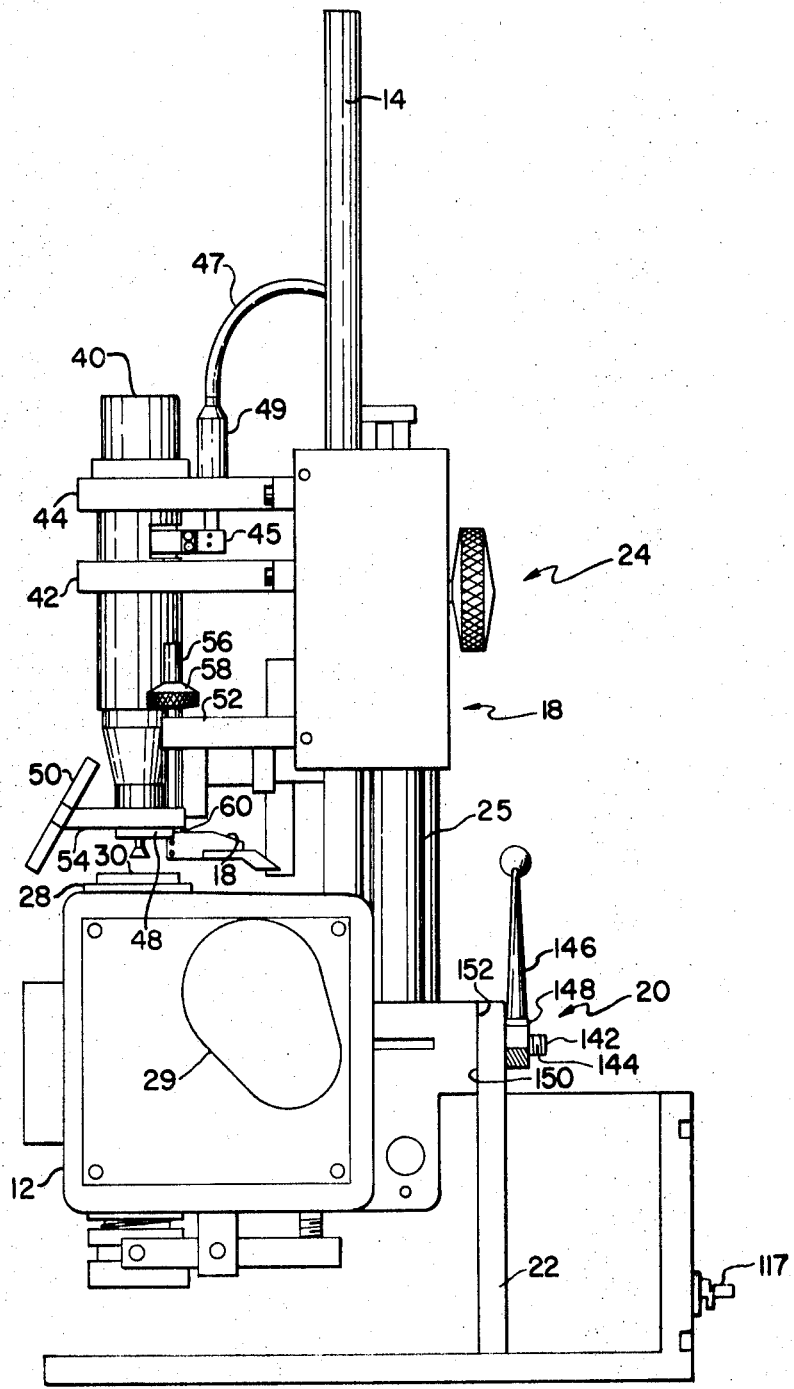
FIG. 2 is a side elevation of the welding apparatus of FIG. 1.
Figure 3:
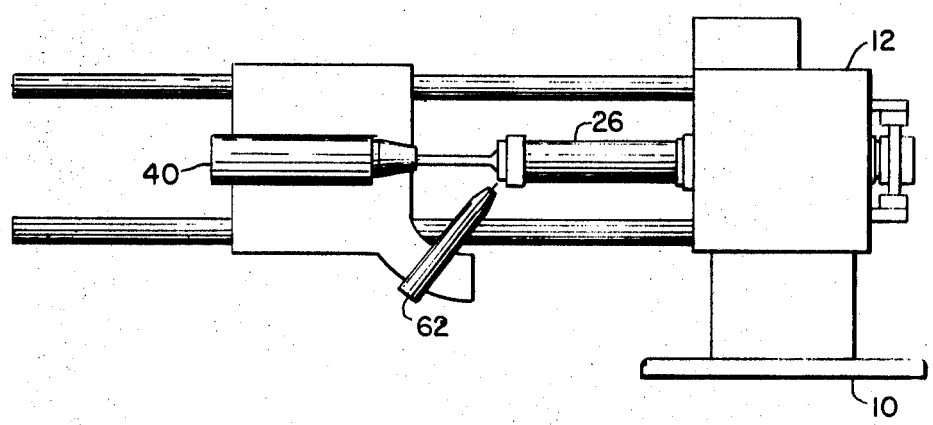
FIG. 3 is a front elevation of the welding apparatus of FIG. 1 rotated to the horizontal position.

Generally, the welding apparatus illustrated in FIGS. 1, 2 and 3, is comprised of a base 10, a housing 12 pivotably and slidably mounted to base 10, shafts 14 and 16 affixed to housing 12 and a carriage 18 slidably mounted to shafts 14 and 16. A clamp 20 frictionally engages an upstanding member 22 of base 10 and housing 12 to clamp base 10 and housing 12 against rotation. A vertical slide adjusting control 24 engaging a sliding carriage 18 and a carriage supporting member 25 affixed to housing 12 via appropriate gearing is provided for selectively positioning carriage 18 along the longitudinal axis of supporting member 25. Inspection of the components mounted within housing 12 is facilitated by access covers 27 and 29.

Mounted within housing 12 is a spindle 26 which is provided with a locking device 28 for clamping a workpiece 30 to spindle 26. A programmable cam assembly 32 having a plurality of sequentially rotatable interrelated sections 33, engagement of adjacent sections to one another being governed by correlative control arms 35, is drivingly connected to spindle 26.

A draw bar assembly 34 having a rotatable threaded member 37 is affixed to housing 12 via extending members 36 and 38. Member 37 is drivingly connected to spindle 26 in such a manner that, when member 37 is rotated in a forward direction, spindle 26 is extended out of housing 12, and when member 37 is rotated in a reverse direction, spindle 26 is retracted into housing 12.

A heat sink assembly 40, affixed to carriage 18 via annular clamps 42 and 44, is provided with a contactor 46 which is adapted for reciprocal movement therein. Contactor 46 is in planar relationship with workpiece 30 so that, when extended, contactor 46 is in contact with workpiece 30. A control valve 45 having a pneumatic line 47 affixed thereto via a fitting 49 is connected so heat sink 40 for regulating the reciprocal movement of contactor 46. A finger 48 and an ultraviolet absorbing light transmitting glass 50 are slidably and rotatably mounted to an extending member 52 of carriage 18. Glass 50 is pivotably mounted to a platform 54 and is affixed to carriage 18 via extending member 52, a threaded shaft 56 and an adjusting knob 58 which is threaded on shaft 56. By rotating knob 58 in a forward and reverse direction, glass 50 is moved slidably toward and away from housing 12, respectively. Finger 48 is rotatably mounted to member 52 via a threaded rod 60 which is slidably mounted within a bracket 61. An adjusting knob 63 threaded onto rod 60 is provided for selectively positioning finger 48.

Figure 6:
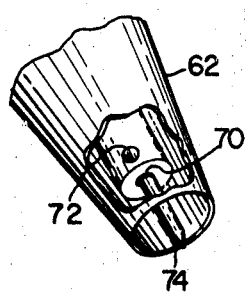

A torch 62 is slidably mounted o carriage 18 by means of a bracket 64. An arcuate support 66, formed with a plurality of radially disposed mounting holes 68, is affixed by means of a bracket 69 to carriage 18 for providing angular rotation of torch 62 with respect to carriage 18. In the preferred embodiment of the present invention, as shown in FIG. 6, the working end of torch 62 is formed with an opening 70 and a plurality of ports 72 disposed about opening 70. Opening 70 is adapted for reception of an electrode 74, for example a tungsten electrode, and ports 72 are adapted for exhausting an inert gas, for example argon, helium or a combination thereof. The other end of torch 62 is adapted for reception of a line 75. Inert gas is supplied to torch 62 via a tee fitting 78 which is connected to a control 79, a line 81 and line 75.

Figure 5A:
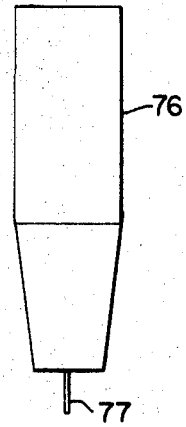
FIG. 5a is a front elevation of a Tungston Inert Gas Torch.
Figure 5B:
Figure 5C:
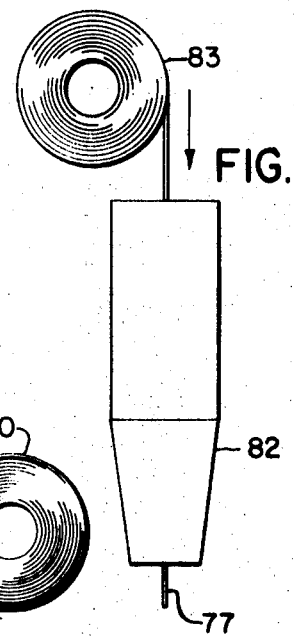
FIG. 5c is a front elevation of a Metal Electrode Inert Gas Torch.

As shown in FIGS. 5a, b and c by way of example, a variety of torches may be utilized with the present invention. A tungsten inert gas torch 76 having a tungsten electrode 77 is shown in FIG. 5a, a tungsten inert gas cold wire feed torch 76a having a wire feeding device 80 is shown in FIG. 5b and a metal electrode inert gas torch 82 having a feeding device 53 is shown in FIG. 5c.

Figure 4:
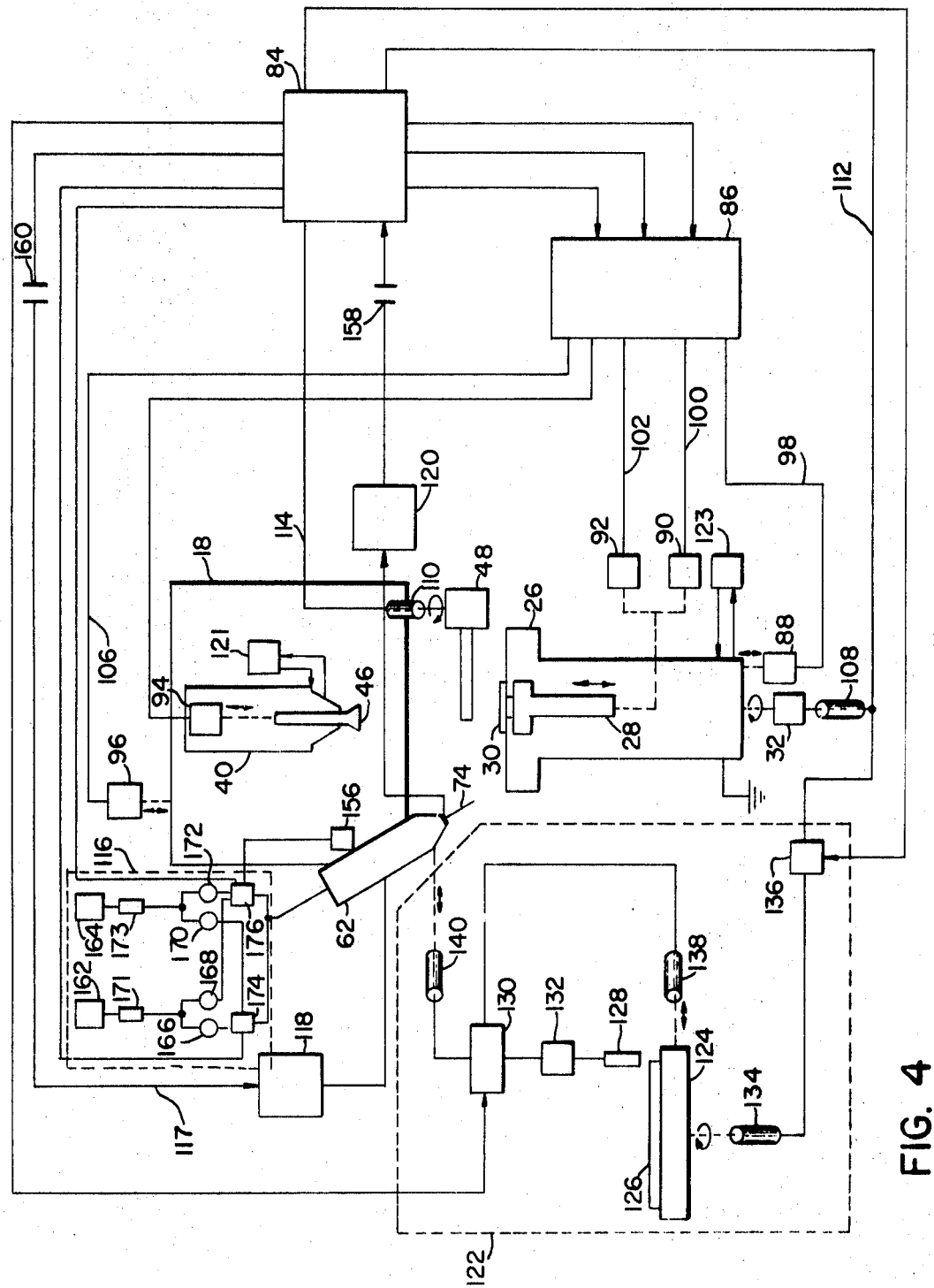
FIG. 4 is a schematic diagram of a system embodying the present invention.

For a fuller understanding of the operation of the welding apparatus embodying the present invention, reference now is made to the schematic diagram of FIG. 4. Generally, the electrical components are energized from a control panel 84 and the pneumatic devices are activated from a regulator panel 86 which is governed by signals generated from control panel 84. Pneumatic devices 88, 90, 92, 94 and 96 are hydraulically connected to regulator panel 86 via lines 98, 100, 102, 104 and 106, respectively. Pneumatic devices 88, 94, and 96 are operatively connected to draw bar assembly 34, contactor 46 and carriage 18, respectively, for controlling the slidable movement thereof.

Pneumatic devices 90 and 92, operatively connected to locking device 28, are provided for clamping and ejecting workpiece 30, respectively.

Servo devices 108 and 110 are electrically connected to control panel 84 via leads 112 and 114, respectively. Servo devices 108 and 110 are drivingly connected to spindle 26 and finger 48, respectively, for controlling the rotational movement thereof.

Inert gas means 116 is operatively connected to torch 62 and electrically connected to control panel 84, so that, when inert gas means 116 is energized by a signal from control panel 84, inert gas flows from 116 through torch 62 and is exhausted through ports 72. A connector 117 of an arc current supply 118 is electrically connected to control panel 84 and torch 62. A voltage sensor 120, electrically connected to torch 62 and control panel 84, is provided for governing the spatial relationship of electrode 74 and workpiece 30. In the preferred embodiment of the invention, heat sink 40 and spindle 26 are water cooled via heat exchangers 121 and 123, respectively.

In a modification of the present invention, a servo follower 122 is operatively connected to the welding apparatus. Servo follower 122 comprises a table 124 having a pattern 126 on the upper surface thereof, pattern 126 conforming to the dimensional characteristics of the weld to be applied to workpiece 30, a photoelectric device 128 electrically connected to a servo amplifier 130 via photoelectric amplifier 132, a servo 134 is electrically connected to servo 108 via a servo amplifier 136 for synchronously rotating table 124 with spindle 26, and servo devices 138 and 140, electrically connected to servo amplifier 130, are drivingly connected to table 124 and torch 62 in such a manner that table 124 and torch 62 are slidable synchronously. Servo 138 is responsive to the signal at the output of photoelectric device 128 in such a manner that photoelectric device 128 traces the outline of pattern 126 as table 124 is rotated.

As previously stated, housing 12 is pivotally mounted to member 22 about a pin 142 having threads 144 at one end thereof. When large workpieces are to be welded (i.e. workpieces of such a dimension that there is an interference with base 10 and the workpiece when the workpiece is inserted in spindle 26) housing 12, column 14 and 16, and carriage 18 are rotated to the horizontal position. A lever 146 having a nut 148 affixed to one end thereof is rotated in a direction to unscrew nut 148 from threads 144 thereby permitting housing 12 to be pivoted to the horizontal position. When housing 12 is in the horizontal position, lever 146 is rotated in the opposite direction so that faces 150 of housing 12 and facet 152 of member 22 frictionally bear against each other and pivoting of housing 12 is prevented.

A typical welding cycle, hereinafter described is initiated by depressing of a start switch 154. A panic switch 155 is provided for deenergizing the welding apparatus in an emergency situation. When start switch 154 is depressed, pneumatic devices 94 and 96 are activated in consequence contactor 46 and carriage 18 are moved toward workpiece 30. In addition, finger 48 is rotated into a planar position between contactor 46 and workpiece 30 via servo 110. When torch 62 travels away from microswitch 156, inert gas means 116 is energized and inert gas is permitted to flow out of ports 72. As torch 62 reaches a preset position, a signal is generated from control panel 84 to regulator panel 86, in consequence pneumatic device 90 is activated and workpiece 30 is clamped in locking device 28. When workpiece 30 is clamped securely, a signal from control panel 84 is applied to servo 110 and pneumatic device 94, thereby causing finger 48 to rotate out of the line-of-sight between heat sink 40 and workpiece 30, and causing contactor 46 to engage workpiece 30. Rotation of finger 48 causes actuation of a weld contactor 158 and a high frequency contactor 160, in consequence voltage sensor 120 is energized. A signal from voltage sensor 120 is applied to pneumatic device 96, thereby sliding carriage 18 and torch 62 toward workpiece 30 until an arc strikes therebetween, spindle 26 being at ground potential. Welding current is generated from arc current supply 118. Once the arc strikes, torch 62 will continue to travel until the voltage sensor 120 nulls at a preset arc voltage, typically 26 volts. If the arc voltage increases, torch 62 is moved toward workpiece 30 and if the arc voltage decreases, torch 62 is moved away from workpiece 30. Accordingly, the spatial relationship of torch 62 and workpiece 30 remains relatively constant between preset upper and lower limits of voltage sensor 120, thereby permitting the welding of irregular joints. When the arc current has risen to a preset level, a signal from control panel 84 is applied to serve 108 in consequence spindle 26 rotates. Cam assembly 32 is programmed to generate a signal responsive to the rotation of spindle 26. This cam signal is applied to control panel 84 which is turn deenergizes contactors 158 and 160. When contactors 158 and 160 are deenergized a signal from control panel 84 is applied to pneumatic devices 94 and 96, in consequence contactor 46 and carriage 18 are moved away from workpiece 30. As carriage 18 travels away from workpiece 30, control panel 84 generates an eject signal to regulator 86 whereby pneumatic device 90 is deenergized, pneumatic device 92 is activated and workpiece 30 is ejected from spindle 26.

As previously stated, cam assembly 32 is programmed for deenergized contactors 158 and 160 as a function of the rotation of spindle 26. Accordingly, it will be readily appreciated that cam assembly 32 can be preset for continuous welding or tacking.

In the illustrated embodiment, inert gas means 116 includes gas supplies 162 and 164; a plurality of control valves 166, 168, 170 and 172, valves 166 and 168 being connected to supply 162 via a flow control 171 and valves 170 and 172 being connected to supply 164 via a flow control 173; and valve 174 and 176, control valves 166 and 170 being connected to the inputs of valve 174 and control valves 168 and 172 being connected to the input of valve 176, the outputs of valves 174 and 176 are connected to torch 62. As torch 62 travels away from microswitch 156, valve 176 is energized whereby a mixture of inert gas as specified by the setting of control valves 168 and 172 is applied to torch 62. When the arc current has risen to a preset level, a signal from control panel 84 is applied to valves 174 and 176 whereby valve 176 is deenergized and valve 174 is energized. In consequence, a mixture of inert gas as specified by the setting of control valves 166 and 170 is applied to torch 62.

Since certain changes may be made in the foregoing disclosure without departing from the scope of the invention herein involved, it is intended that all matter contained in the above description and shown in the accompanying drawings be construed in an illustrative and not in a limiting sense.

What is claimed is:
1. An arc welding apparatus comprising:
 a. a base;
 b. a housing pivotably mounted on said base;
 c. a carriage slidably mounted to said housing;
 d. a spindle for receiving a workpiece rotatably and slidably affixed to said housing, said spindle being at ground potential;
 e. means for rotating said spindle;
 f. means for sliding said spindle;
 g. locking means affixed to said spindle for engagement and disengagement of said workpiece, said workpiece being engaged when securely held in said spindle and being disengaged when removably seated in said spindle;
 h. a torch slidably mounted to said carriage, said torch having an opening and a plurality of ports positioned about said opening;
 i. means for projecting an electrode through said opening;
 j. means for exhausting an inert gas through said ports;
 k. switch means for controlling said inert gas exhausting means, said switch means being responsive to the movement of said torch;
 l. voltage sensing means for providing a signal representative of the distance between said torch and said workpiece;
 m. means responsive to said distance representative signal for sliding said carriage,
 n. means for providing an arc current to said electrode; and
 o. means for ejecting said workpiece from said spindle.

2. The apparatus as claimed in claim 1, further comprising a heat sink slidably mounted to said carriage for engagement with said workpiece.

3. The apparatus as claimed in claim 1 wherein a cam means is operatively connected to said arc current providing means for controlling said arc current.

4. The apparatus as claimed in claim 1 further comprising
   a. a finger rotatably mounted to said carriage, said finger generating a signal to said locking means for controlling said locking means; and
   b. means for engaging and disengageing said finger, said finger being engaged when rotated into planar relationship with said workpiece and disengaged when rotated away from said workpiece.

5. The apparatus as claimed in claim 1 wherein said electrode is tungsten. 12

6. An arc welding apparatus comprising:
   a. a base;
   b. a housing pivotably mounted on said base;
   c. a carriage slidably mounted to said housing;
   d. a spindle rotatably and slidably affixed to said carriage for receiving a workpiece, said spindle being at ground potential;
   e. means for rotating said spindle;
   f. means for sliding said spindle;
   g. locking means affixed to said spindle for engagement and disengagement of said workpiece, said workpiece being engaged when securely held in said spindle and being disengaged when removably seated in spindle;
   h. a heat sink slidably mounted within said carriage for engagement with said workpiece;
   i. a torch slidably mounted to said carriage, said torch having an opening and a plurality of ports positioned about said opening;
   j. an electrode projecting through said opening;
   k. means for exhausting an inert gas through said parts;
   l. switch means responsive to the movement of said torch for controlling said inert gas exhausting means;
   m. a finger rotatably mounted to said carriage for controlling said locking means;
   n. means for engaging and disengaging said finger, said finger being engaged when in juxtaposition with said workpiece and disengaged when rotated away from said workpiece;
   o. voltage sensing means for providing a signal representative of the distance between said torch and workpiece;
   p. means responsive to said distance representative signal for sliding said carriage;
   q. means for providing an arc current to said electrode; and
   r. means for ejecting said workpiece from said spindle.

7. The apparatus as claimed in claim 6 wherein said electrode is tungsten and said inert gas is a mixture of argon and helium.

8. The apparatus as claimed in claim 6 wherein said spindle rotating means is servo means.

9. The apparatus as claimed in claim 6 wherein said spindle sliding means is pneumatic means.

10. The apparatus as claimed in claim 6 wherein said torch sliding means is pneumatic means.

11. The apparatus as claimed in claim 6 wherein cam means is operatively connected to said arc current means for controlling said arc current.

12. The apparatus as claimed in claim 6 wherein said ejecting means is pneumatic means.

13. An arc welding apparatus comprising:
   a. a base;
   b. a housing pivotably mounted on said base;
   c. a carriage slidably mounted on said base;
   d. a spindle rotatably and slidably affixed to said housing for receiving a workpiece, said spindle being at ground potential;
   e. servo means for rotating said spindle;
   f. pneumatic means for sliding said spindle;
   g. locking means affixed to said spindle for engagement and disengagement of said workpiece, said workpiece being engaged when securely held in said spindle and being disengaged when removably seated in said spindle;
   h. a heat sink slidably mounted within said carriage for engagement with said workpiece;
   i. a torch slidably mounted to said carriage, said torch having an opening and a plurality of ports positioned about said opening;
   j. means for projecting an electrode through said opening;
   k. means for exhausting an inert gas through said ports;
   l. switch means responsive to the movement of said torch for controlling said inert gas exhausting means;
   m. a finger rotatably mounted to said carriage for controlling said locking means;
   n. means for engaging and disengaging said finger, said finger being engaged when in juxtaposition with said workpiece and disengaged when rotated away from said workpiece;
   o. voltage sensing means for providing a signal representative of the distance between said torch and workpiece;
   p. pneumatic means responsive to said distance representative signal for sliding said carriage;
   q. means for providing an arc current to said electrode;
   r. cam means operatively connected to said arc current providing means for controlling said arc current; and
   s. pneumatic means for ejecting said workpiece from said spindle.

14. The apparatus as claimed in claim 13 in combination with a servo follower.

15. The apparatus as claimed in claim 14 wherein said servo follower comprises:
   a. a table having a pattern conforming to the dimensional characteristics of a weld to be applied to the workpiece;
   b. a first servo amplifier connected to said rotating spindle servo means;
   c. servo means electrically connected to said first servo amplifier for rotating said table synchronously with said spindle;
   d. photoelectric means;
   e. a second servo amplifier electrically connected to said photoelectric means;
   f. table servo means electrically connected to said second servo amplifier for sliding said table; and
   g. torch servo means electrically connected to said second servo amplifier for sliding said torch, said torch and table being synchronously slidable, said photoelectric means tracing the outline of the pattern on said table.